L. H. BRIGHTMAN.
MACHINE FOR MAKING NUT BLANKS.
APPLICATION FILED OCT. 19, 1915.

1,226,302.

Patented May 15, 1917.
8 SHEETS—SHEET 1.

Witnesses
R. M. McCormick.
A. L. Phelps

Inventor
Latham H. Brightman

By
Attorney

L. H. BRIGHTMAN.
MACHINE FOR MAKING NUT BLANKS.
APPLICATION FILED OCT. 19, 1915.

1,226,302.

Patented May 15, 1917.
8 SHEETS—SHEET 3.

Witnesses
R. M. McCormick
A. L. Phelps

Inventor
Latham H. Brightman

By
C. C. Shepherd, Attorney

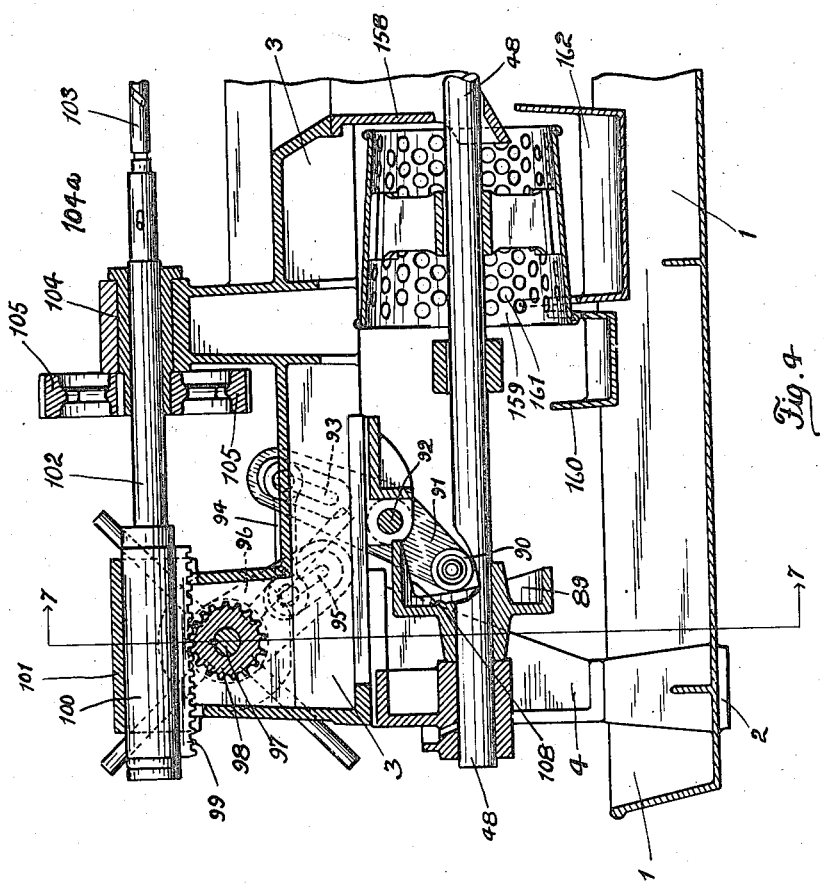

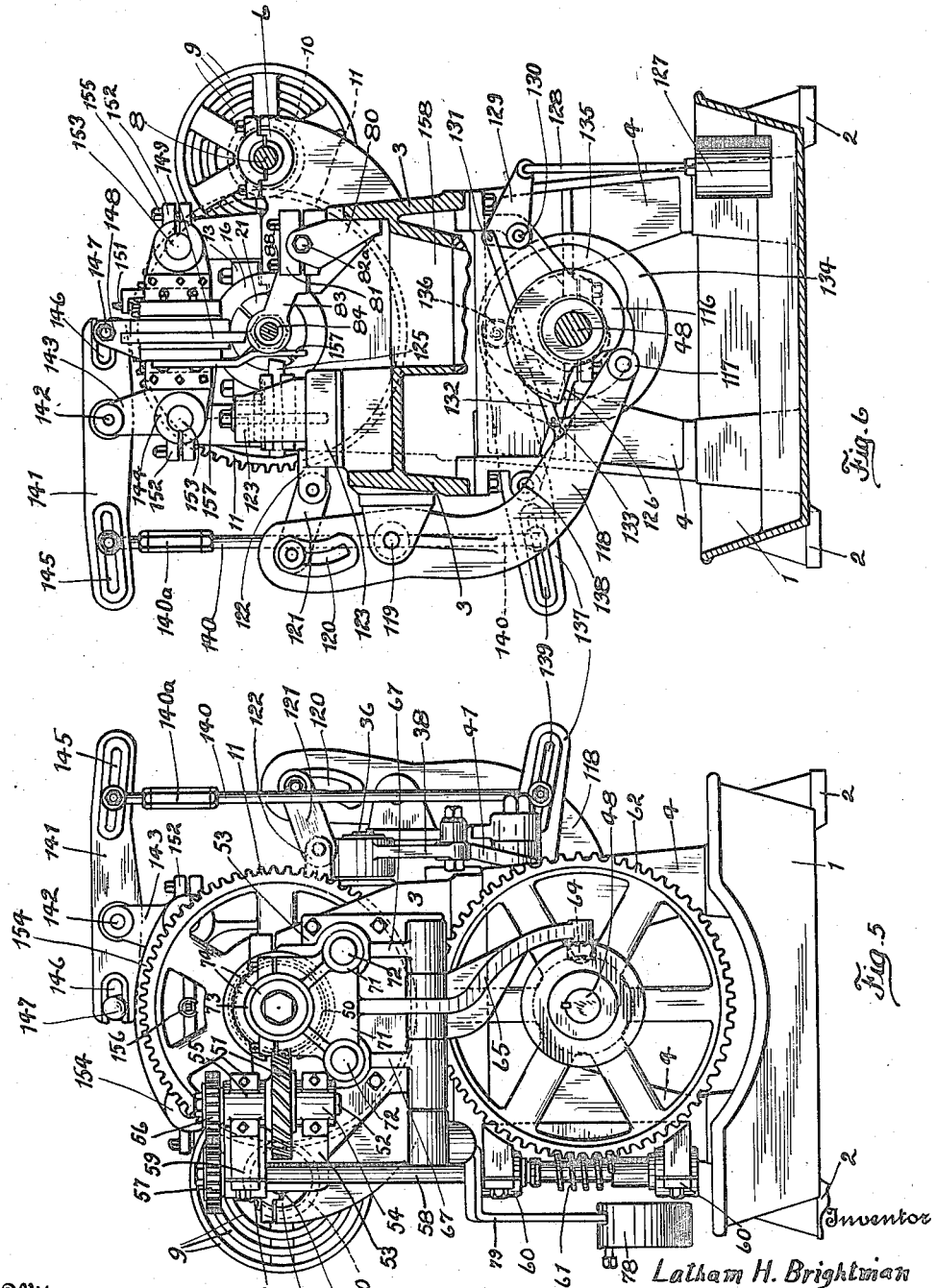

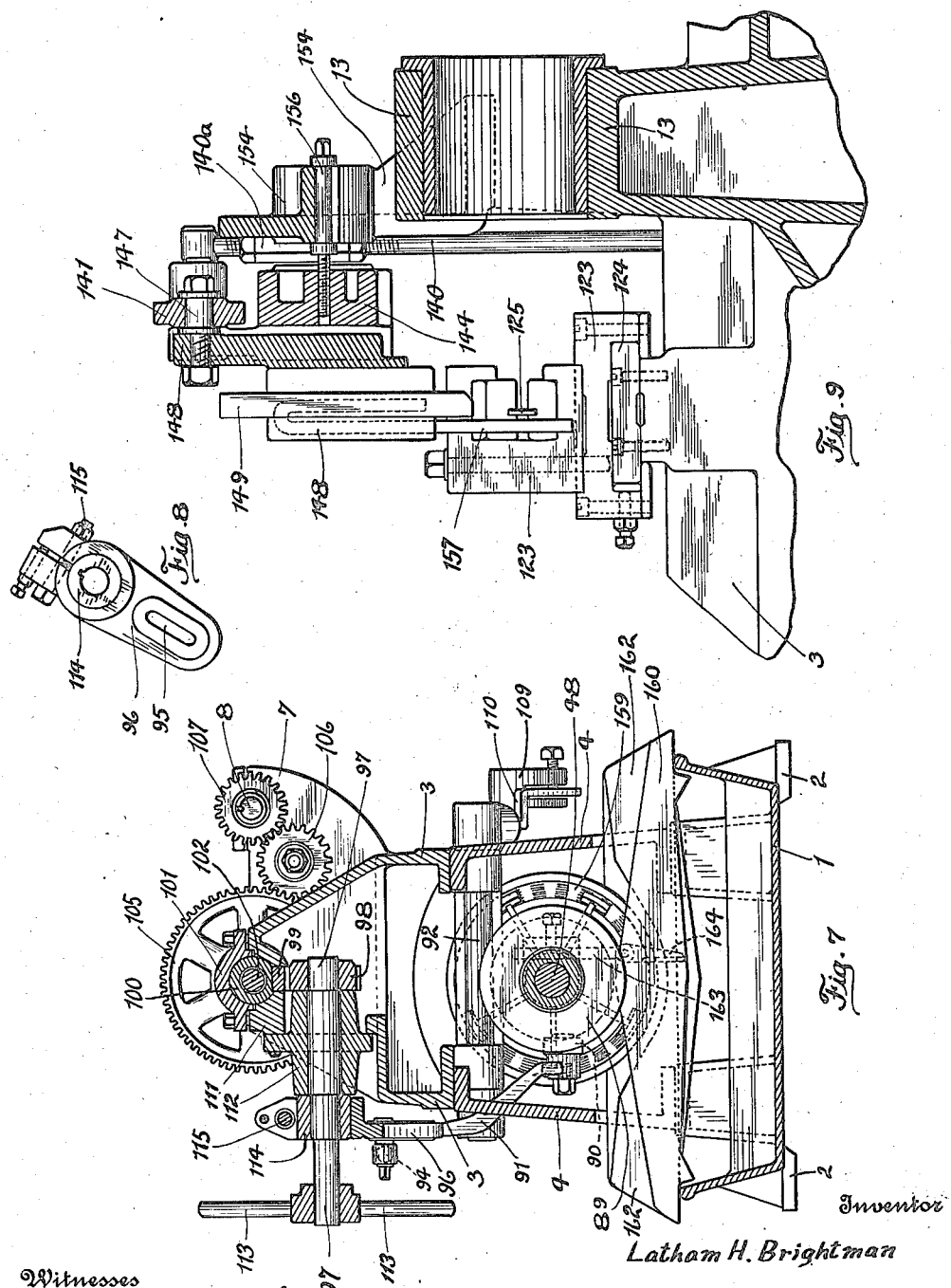

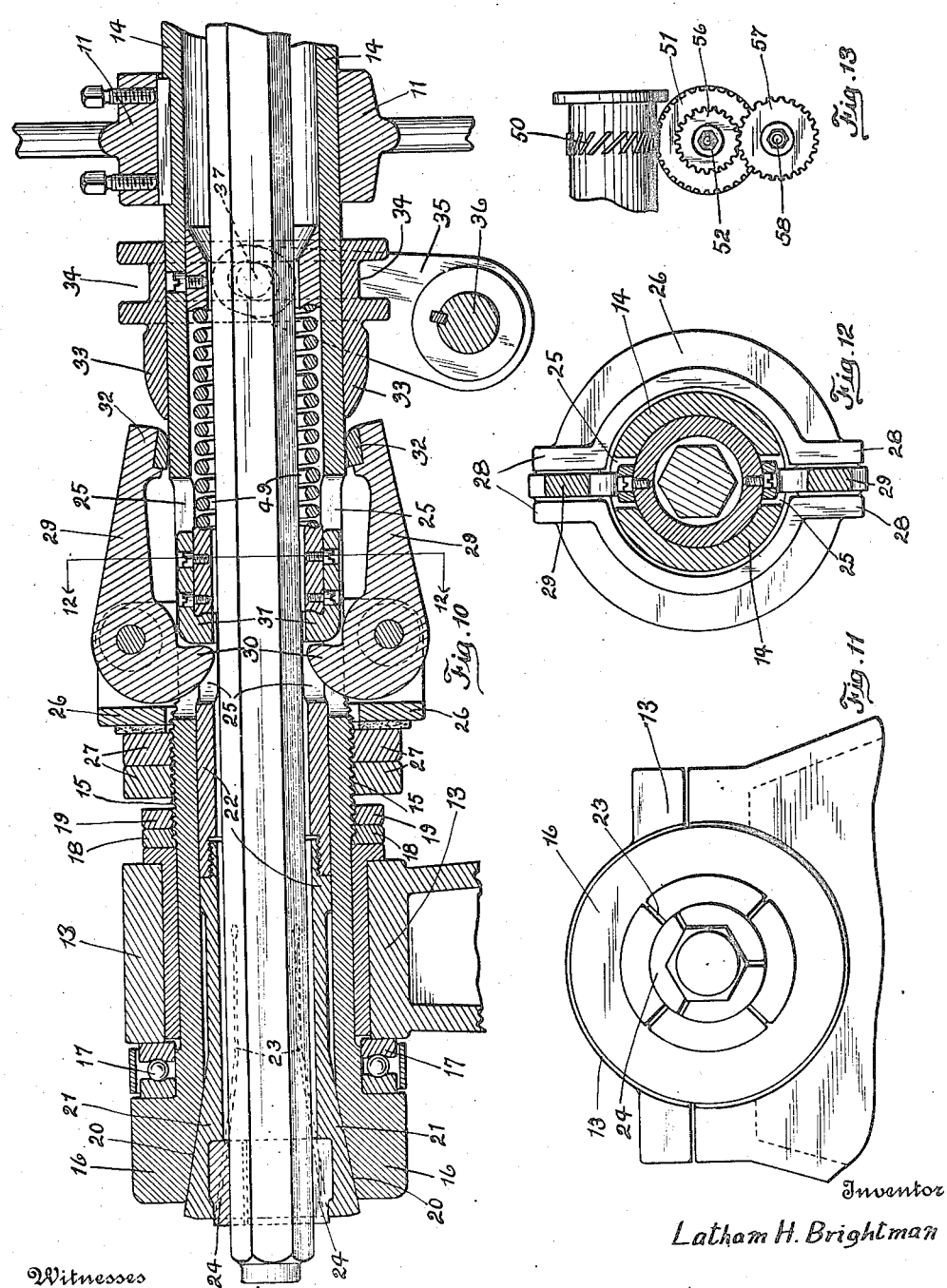

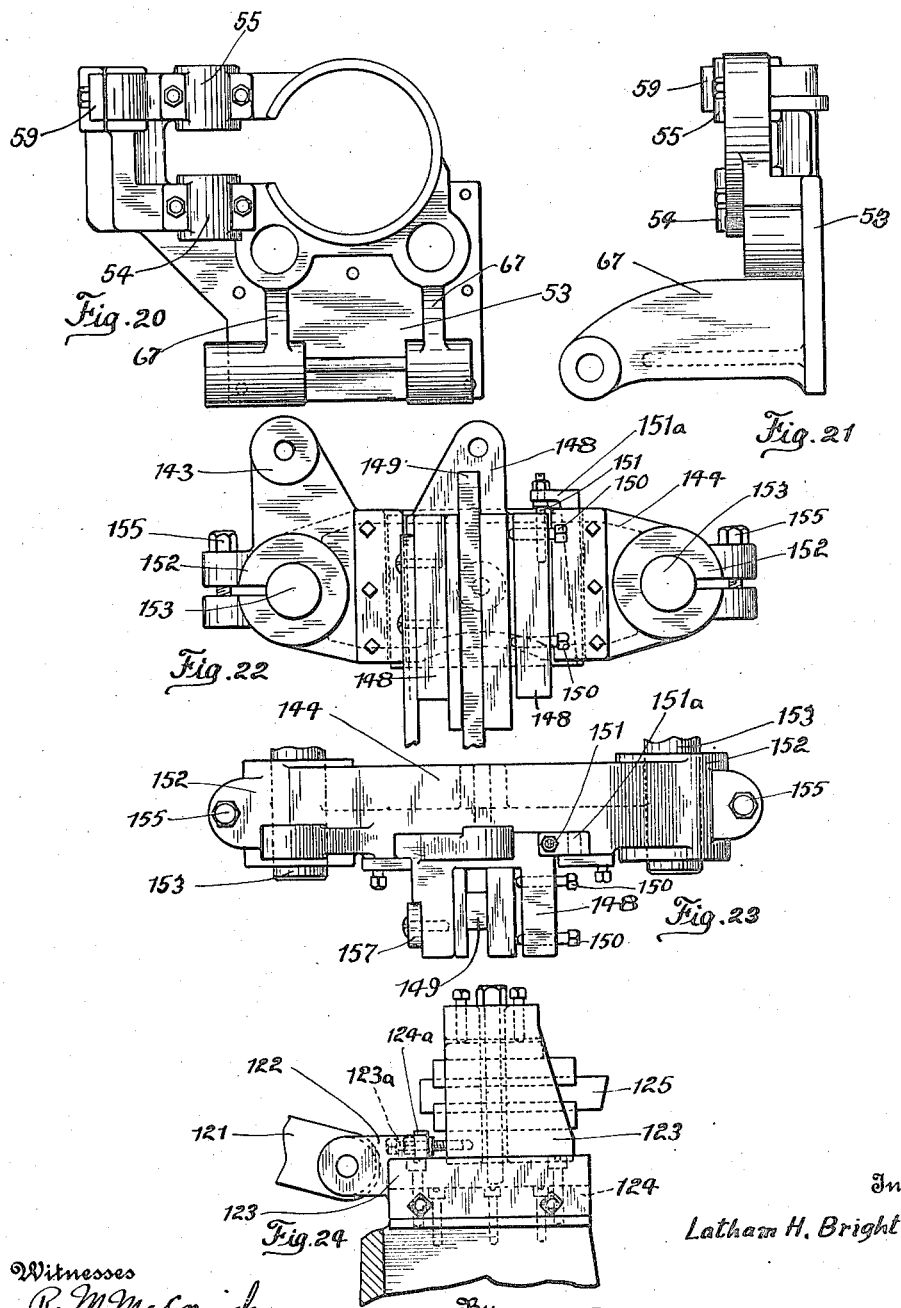

UNITED STATES PATENT OFFICE.

LATHAM H. BRIGHTMAN, OF COLUMBUS, OHIO.

MACHINE FOR MAKING NUT-BLANKS.

1,226,302.

Specification of Letters Patent. Patented May 15, 1917.

Application filed October 19, 1915. Serial No. 56,785.

*To all whom it may concern:*

Be it known that I, LATHAM H. BRIGHTMAN, a citizen of the United States, residing at Columbus, in the county of Franklin and State of Ohio, have invented certain new and useful Improvements in Machines for Making Nut-Blanks, of which the following is a specification.

My present invention relates to machines for making nut blanks and is particularly directed to that class of machines wherein the nut blanks are made from cold stock preferably of such shape as is desired in the general outline of the finished nut itself. The arrangement consists essentially of feeding a stock bar of the proper shape into the machine, after which the blanks in proper lengths are severed therefrom. Also, means are provided whereby the top face is preferably chamfered in the customary manner. In this connection, one of the principal objects of my invention resides in a construction whereby the chamfering tool is withdrawn from the cutting position prior to the time that the cut off tool has completed the severance of the nut. In this manner, all score marks are eliminated from the top face of the nut blank whereas if this chamfering tool is left in its operative position until the blank has been severed, a line representing a projecting fin or bur would be left where the chamfering tool finished its cut. In the above arrangement, the further object of my invention resides in means for preventing the rearward movement of the severed nut blank between the cut off tool and the stop against which the stock bar is fed after the completion of the severance. By this construction, the cut off tool is prevented from breaking and the machine itself prevented from abnormal wear.

Still a further object of my invention resides in the peculiar type of stop against which the stock bar is fed, this stop also serving the purpose of guiding the boring tool centrally into the stock bar in order to maintain the proper alinement. This stop is so constructed that its underside is open to such extent that the shavings withdrawn from the drill in its boring operation into the stock bar, are allowed to escape and at the same time not coming between the end of the stock bar and the stop.

My invention also consists in a number of other improvements the details of which will be brought out in the description of the preferred embodiment of my machine as represented in the accompanying sheets of drawings, wherein similar characters of reference designate corresponding parts, and wherein:

Figure 1 is a view in side elevation showing the feed end of my machine only,

Fig. 2 is a view in side elevation of the remaining portion or the drill end of my machine, Fig. 3 is a longitudinal section of the structure shown in Fig. 1, Fig. 4 is a longitudinal section of the structure shown in Fig. 2, Fig. 5 is an end view looking from the right of Figs. 1 and 3, Fig. 6 is a section represented by line 6—6 of Figs. 1 and 3, Fig. 7 is a section taken on line 7—7 of Figs. 2 and 4, Fig. 8 is a detail side view of a clamp member used in feeding the drill into a stock bar, Fig. 9 is an enlarged cross sectional detail showing the construction and arrangement of chamfering tool on an enlarged scale from that shown in Fig. 3, Fig. 10 is an enlarged cross section through the stock bar chuck, Fig. 11 is a view looking from the left of the structure shown in Fig. 10, Fig. 12 is a section taken on line 12—12 of Fig. 10, Fig. 13 is a plan view showing an arrangement of gears used in driving the cut off and chamfering tools and the boring tool, Fig. 14 is a detail side view of the stop member against which the stock bar abuts, shown detached, Fig. 15 is an end view of the structure shown in Fig. 14, Fig. 16 is a detail view in perspective showing the bushing member used in this stop mechanism separately, Fig. 17 is a detail view of one of the cams shown in Fig. 3, Figs. 18 and 19 are top plan and end views respectively of another cam shown in Fig. 3.

Fig. 20 is an end view of a supporting casting shown in Fig. 5,

Fig. 21 is a side view of the same,

Fig. 22 is a detail view showing the construction of chamfering tool support,

Fig. 23 is a top plan view of the structure shown in Fig. 22, and

Fig. 24 is a detail view in side elevation of the cut off tool.

In these several views, there is shown a dish or pan member 1, upon which the machine as a whole is mounted and which is itself bolted to the floor by means of the outstanding ears shown at 2. The machine itself comprises a general framework designated 3 which framework is mounted upon the pan or dish member 1 through the medium of a plurality of legs shown at 4. This general framework is provided with a set of three bearings designated 5, 6 and 7 all properly alined and in which the main drive shaft 8 is rotatably journaled. Power is applied to this shaft from any source by means of the cone pulleys shown at 9, the various sizes of pulleys affording means for regulating the speed at which this shaft is driven.

Figure 3:
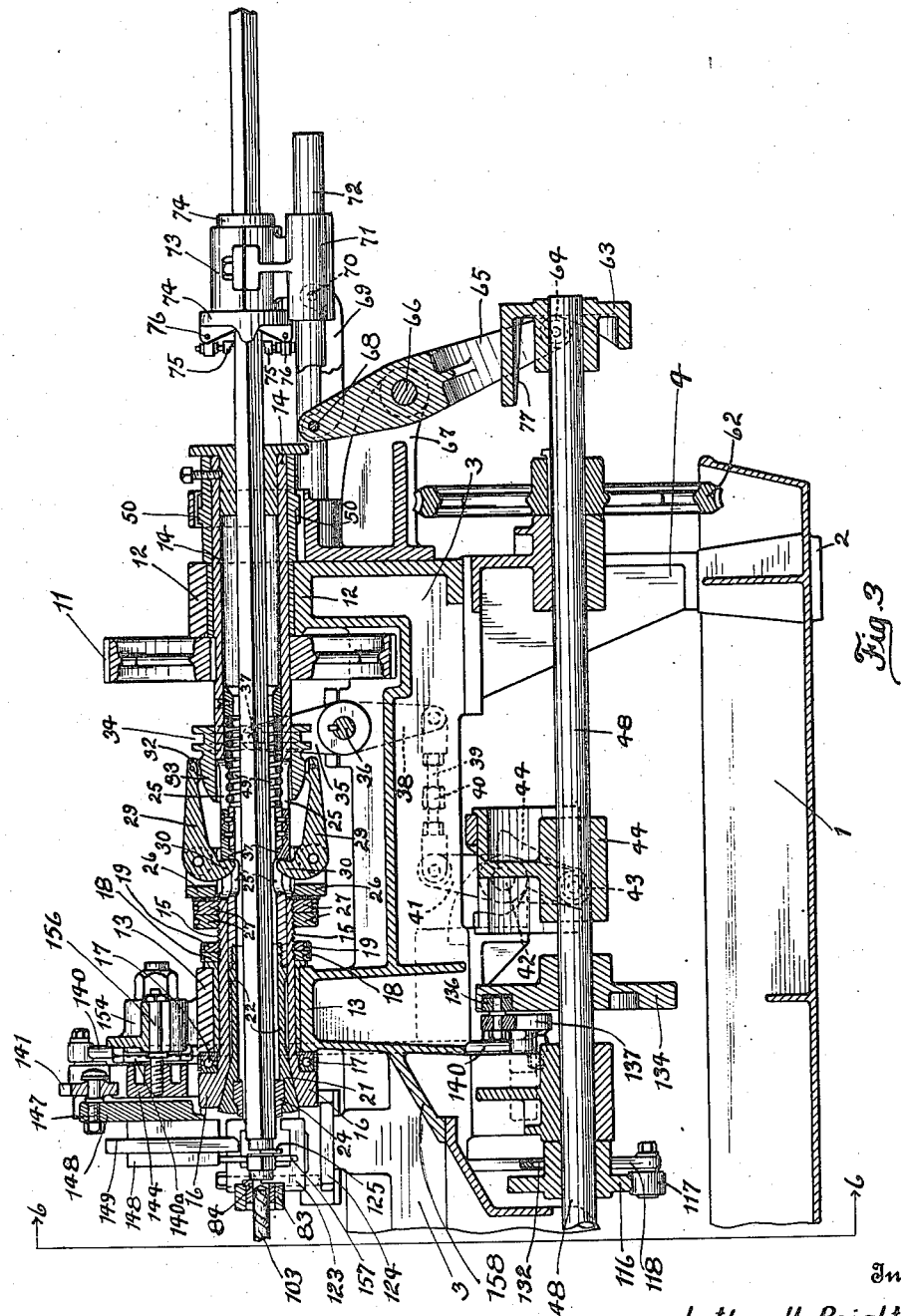

On this shaft, there is also mounted a pinion 10, which pinion meshes with a large spur gear 11 rigidly mounted in connection with the chuck structure as shown more clearly in Figs. 3 and 10. This chuck as is shown, is rotatably mounted in bearings 12 and 13, which bearings form a portion of the general framework. The chuck itself comprises an outer sleeve member 14 threaded as is shown at 15 and enlarged at its forward end, as is shown at 16. Between this enlargement and the bearing 13, there is interposed a ball thrust bearing 17 and the chuck as a whole then held against movement longitudinally by means of the nut shown at 18 and the lock nut 19. This sleeve, however, has its forward end flared as is shown at 20 to coöperate with a correspondingly flared end 21 of an inner sleeve member 22, the rear end of this latter sleeve member being slotted as is shown at 23 so that the flared end 21 may be contracted as it is wedged into engagement with the flared end 20 of the outer sleeve. This inner sleeve also carries a collar 24 at its forward end which collar is made of a plurality of sections as is shown more clearly in Fig. 11 and this collar has its bore so shaped as to fit the contour of the stock bar being fed through it. Therefore, in reality, it is this collar 24 which is brought into clamping engagement with the stock bar when the inner sleeve 22 is moved rearwardly.

In order to move this sleeve rearwardly, both the inner and outer sleeves are provided with a pair of diametrically opposed slots such as shown at 25 and the outer sleeve is provided with a collar 26 rigidly held in its position by means of the nuts 27 and it is further provided with pairs of diametrically opposed ears 28 between which dogs 29 are pivoted. The inner ends 30 of these dogs are designed to engage wearing strips 31 carried by the inner sleeve and the outer or longer ends 32 coöperate with a cone 33 to be spread apart by the same. This cone slides upon the chuck as a whole or more specifically, upon the outer sleeve and has a circumferential groove 34, which groove is engaged by the arms 35 rigidly mounted upon a shaft 36. When this cone is forced between the long arms of the dogs 29, the short arms draw the inner split sleeve inwardly so that the conical end of the latter is compressed to close the collar 21 upon the stock to firmly clamp the latter.

This cone is actuated in the following manner: The ends of the arms 35 are provided with a pin and slot connection with the cone as is shown at 37 and as has been related, these levers are mounted on the shaft 36 journaled in the main framework. This shaft 36 also carries a depending lever arm 38 which is pivotally connected with a link 39 adjustable as to its length by means of the turn buckle arrangement such as shown at 40. This link is also pivotally connected to one end of a lever arm 41, which latter is also pivotally mounted intermediate its ends, as is shown at 42. At its lower end, this lever 41 carries a roller 43 which is designed to coöperate with the cam 44 shown in detail in Figs. 18 and 19. It will be noted that this cam is provided with two edges 45 and 46 to form the groove 47 and the length of this groove is comparatively small when considering the length of an entire revolution of the shaft 48 upon which this cam is mounted. Consequently, the chuck is only released through a very small portion of the complete cycle of operation of the machine and it is at this time that the stock bar is fed forwardly as will be presently described. Also, this cam operates in opposition to the spring 49 confined within the chuck and operating between the inner and outer sleeves to normally force the inner sleeve in a forward direction to permit a forward feed of the stock bar. Thus, when the dogs 29 are released by the cam 44 engaging the roller 43, the spring 49 exerts its pressure against the inner sleeve and, therefore, the stock bar is released.

This shaft 48 is driven in the following manner: Referring particularly to Figs. 3 and 13, it will be noted that the rear end of the outer sleeve of the chuck is provided with a series of spiral teeth 50 and, therefore, rotation of this chuck will cause a rotation of the spiral gear 51 with which these teeth mesh, this latter gear being mounted on the vertical shaft designated 52 which is mounted in the supporting framework 53 shown in Fig. 5 and in detail in Figs. 20 and 21. As will appear, this shaft is journaled in bearings 54 and 55 and carries a spur gear 56 at its upper end, which spur gear meshes with a complemental spur pinion 57 mounted on a shaft 58. This latter shaft is also journaled in a bearing 59 at the upper end of the supplemental framework 53 and at its lower end in the bearing 60 forming a portion of the general framework. Intermediate its ends, this latter shaft is formed with a worm 61 which meshes with the worm wheel 62, this worm wheel being mounted on the extreme forward end of the shaft 48.

As has already been described, the stock bar is temporarily released at regular intervals during the cycle of operation of the machine, at which time this stock bar is given a further feed forward. This is accomplished in the following manner: The extreme rear end of the shaft 48 carries a cam shown at 63 and this cam coöperates with a roller 64 carried by the end of the lever arm 65. This latter lever arm is pivoted intermediate its ends as shown at 66 to an outwardly projecting ear 67 formed on the general framework and is pivoted at its upper end as is shown at 68 to a link 69 which is in turn pivotally connected at 70 to a carriage 71 slidably mounted on rearwardly projecting rods 72. This carriage is split to form a cap 73 to permit the ready insertion of a bushing 74. This bushing is preferably of a bore to fit the shape of the stock bar and the bushing itself then rotating within the bearing formed by the lower half of the carriage and the cap 73. At the forward end of the carriage, grip members designated generally by the reference numeral 75, are provided, these grip members having teeth on the ends which engage the stock bar and are pivoted to outwardly projecting ears as is shown at 76. It will be noted that these pivot points are to the rear of the gripping surfaces of the gripping members and thus the free movement rearwardly of this gripping carriage is permitted, but upon return movement or to the left of Fig. 3, the gripping surfaces of these gripping members are brought into wedging engagement with the stock bar and consequently this stock bar must be moved in a forward direction. From an inspection of Figs. 1 and 3, it will be seen that the disposition of the cams 44 and 63 is such that the chuck is released just prior to the time that the roller 64 on the lever arm 65 reaches the drop off portion 77 of the cam 63. The rise in the cam to this drop off portion 77 is gradual and, therefore, the carriage 71 is gradually moved rearwardly until this drop off portion is reached. Because of the weight 78, Fig. 1, adjustably carried on the end of the lever 79, which latter is also rigidly mounted in connection with the shaft 66, this carriage is automatically and rapidly moved forward as soon as the drop off portion 77 is reached.

Figure 1:
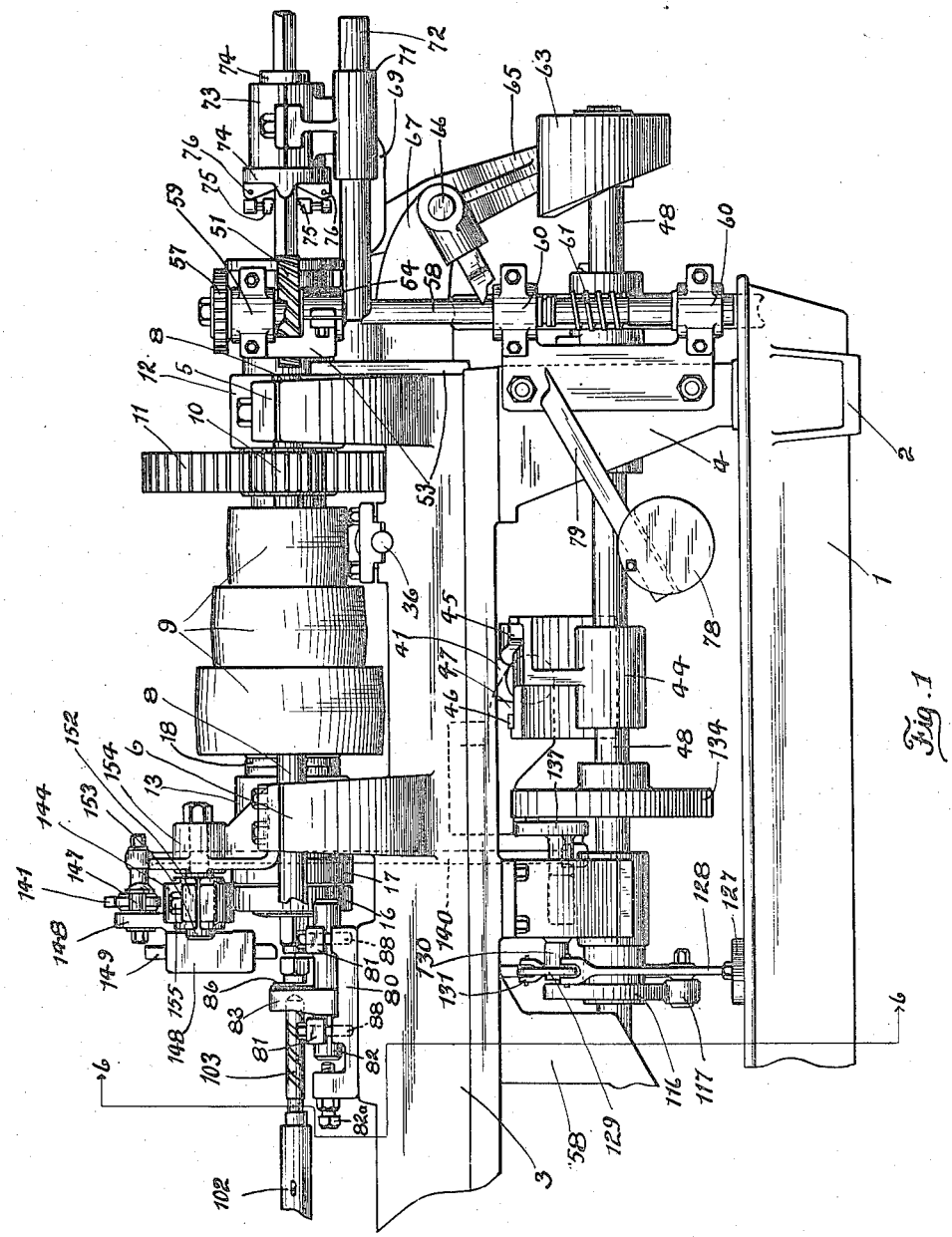

The amount of forward feed of the stock bar is not regulated by the depth of the drop off portion 77 since this depth is to accommodate the maximum sized nut, but is regulated by the stop structure shown in Figs. 1 and 3 and shown in detail in Figs. 14 and 15. This stop structure is so arranged that the end of the stock bar from which the nut blanks are severed, engages the same and thus limits the forward movement of the stock bar. This stop structure comprises a supplemental framework 80 bolted to the general framework to occupy the relative position shown in Figs. 1 and 3. This supplemental framework is provided with a pair of clamping bearings 81 for rigidly clamping the cylindrical portion 82 of the stop proper between them. This member 82 further carries an inclined finger 83 intermediate the bearings 81, which finger is provided with a central bore, as shown, to movably receive the bushing 84. From Fig. 16, it will be noted that the portion 85 of this bushing fits within the extreme end of the finger 83, while the shouldered portion 86 projects into the path of the stock bar and it is this portion which the stock bar abuts. The lower half of the shouldered portion is cut away as is shown at 87 so that the shavings caused from the drill which is used in the machine for boring out the center portion of the blanks, may readily escape to the refuse receptacle located beneath the machine as a whole. In case it is desired to change the length of nut, the screws 88 holding down the cap portions of the bearings 81 are slackened and the screw 82$^a$ carried by the end of the supplemental framework 80 is also adjusted to correspond with the new length of nut. The stop structure is then shifted so that the cylindrical portion 82 engages the end of the screw 82$^a$ whereupon the screws 88 are again tightened to hold the stop structure in its newly adjusted position. Then, by the operation of the end feed mechanism, the stock bar is brought into engagement with the stop in its newly located position each time this end feed mechanism is operated.

Figure 2:
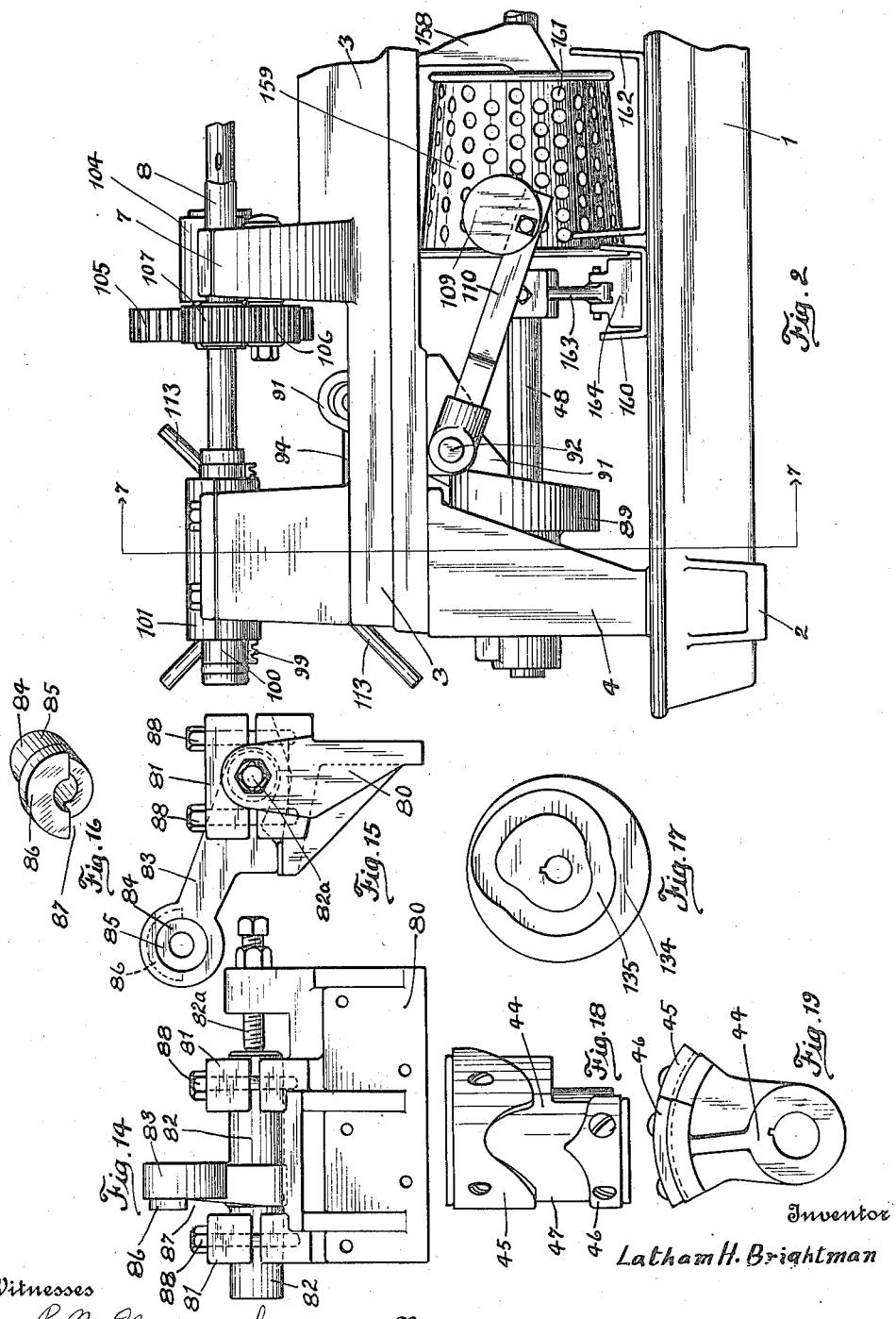

On the extreme left hand end of the shaft 48 there is located a cam 89 which is somewhat similar in shape to the cam 63, although held in a reversed position. This cam coöperates with the roller 90 on one end of the lever 91 pivotally mounted as shown at 92 intermediate its ends to the general framework. At its other end this lever is provided with a slot 93 into which one end of a link 94 is adjustably mounted. The opposite end of this link 94 is connected to the slotted end 95 of a lever 96 rigidly mounted on a shaft 97. On this latter shaft there is keyed a spur pinion 98 which meshes with a rack 99 located on the underside of a sleeve 100. This sleeve is slidably mounted within the bearing portion 101, which in turn rotatably receives the spindle 102 carrying the bit 103. This spindle 102 is also journaled in a bearing 104 by means of the bushing 104$^a$ to which it is slidably keyed and this bushing rigidly carries a gear 105. This latter gear meshes with a pinion 106, Fig. 7, which latter in turn meshes with a pinion 107. Thus the spindle 102 is rotated in the same direction as the main drive shaft 8 and by means of the cam 89 and the connecting structure between this cam and the spindle 102, the spindle is rotated simultaneously with its forward feed. The amount of this forward feed may be regulated by adjusting the link 94 up and down within the slots formed in the ends of the levers 91 and 96. After the drill has been fed forward by the continual rise in the cam surface, the roller reaches the drop off portion 108 and because of the weight 109 carried on the end of the lever 110 rigidly mounted on the outside end of the shaft 92, Fig. 2, the spindle is automatically withdrawn.

It often times becomes desirable to regulate the position of the bit independent of the normal driving connections. These occasions arise when a portion of the bit is broken or after the point has been re-ground. From Fig. 7, it will be noted that the bearing 101 carries a lateral enlargement 111 to which the bearing 112 is bolted. This bearing 112 supports the shaft 97 carrying the pinion 98 and the shaft itself further carries a hand wheel 113 at its outer end. An inspection of this figure and Fig. 8 shows that the lever arm 96 embraces the bushing 114 which is also keyed to the shaft and that the upper end of the lever 96 is split and held together by means of the bolt 115. Therefore, should it be desired to adjust the bit, the screw 115 is slackened and this will then permit the free operation of the hand wheel 113 and also the pinion 98. In this manner the spindle carrying the bit may be adjusted to any desired position. The mechanism for severing the stock bar into required lengths of blanks is shown particularly in Figs. 6, 9 and 24. In Fig. 6, the shaft 48 is shown as being provided with a cam 116, which cam engages a roller 117 on the end of a lever 118. This lever is pivoted intermediate its ends as shown at 119 to the general framework and has a slot 120 in its opposite end. Within this slot there is fastened one end of a link 121 which is connected at its other end to an ear 122 forming a portion of the cut off tool support. This tool support is designated generally by the reference numeral 123 and is slidably mounted upon a guide plate 124 mounted upon the general framework in the manner shown more clearly in Fig. 9, and is adjustable back and forth in this guide plate by means of its threaded engagement with the screw 123$^a$ held in the leg 124$^a$ of the guide plate. In its upper end this guide support carries a cut off tool 125 and by means of the gradual rise in the surface of the cam 116, the lower end of the lever 118 is moved away from the shaft 48 while its upper end is pushed toward the stock bar to gradually move the cut off tool 125 into the stock bar. The distance that the cut off tool is moved into the stock bar, depends on the position the link 121 occupies with respect to the slot 120. After the cut off tool has gone into the stock bar its limit of movement, the roller 117 has reached the drop off portion 126 of the cam 116 and in order that this cut off tool may then be automatically retracted, the weight 127 is provided. This weight hangs by a rod 128 to an arm 129 pivoted to the general framework as shown at 130. This arm 129 is in the nature of a bell crank and is pivotally connected at 131 to a link 132 which latter connects with the lower end of the lever 118 as shown at 133. Therefore, this weight acts to always hold the roller 117 in engagement with the surface of the cam 116 and consequently when the drop off portion 126 is reached, this weight serves to automatically retract the cut off tool.

In practically all types of machine nuts, it is necessary to chamfer the top face and in order to do this, I have provided the structure shown in Figs. 1, 5, 6, 9, 22 and 23. This chamfering tool is also driven from the shaft 48 by means of the cam 134 which latter is shown detached in Fig. 17. This cam is provided with the groove 135 in which the roller 136 operates. This roller is carried on one end of the lever 137 which is pivoted intermediate its ends as shown at 138. The opposite end of this lever is provided with a slot 139 which serves as the means of adjustably connecting the link 140 with the lever 141. This lever 141 is pivoted intermediate its ends as shown at 142 to the upstanding ear 143 of a supplemental chamfering tool framework 144. Also, this lever is provided with a slot 145 in one end and a slot 146 in its opposite end, the slot 145 serving as a means of connecting the link 140, while the slot 146 engages a pin 147 carried in the upper end of a chamfering tool support designated in its entirety by the numeral 148. This chamfering tool support is slidably mounted in the chamfering tool supplemental framework 144 and is preferably disposed at a right angle to the cut off tool, this chamfering tool support carrying the chamfering tool itself 149 and being itself held in any vertical position by means of the screws 150 and adjustable to assume the desired position by turning of the turnbuckle 140ª of the link 140. Should it be desired to adjust this tool support up and down, the screws 150 are slackened and the tool support then shifted under the influence of this turnbuckle 140ª, whereupon the screws 150 may again be tightened and the tool support, therefore, held in its adjusted position. Therefore, it will appear that under the rotation of the shaft 48, the cam 134 will positively move the chamfering tool toward and away from the stock bar. The length of movement of the chamfering tool may also be regulated by shifting the position of the link 140 in either of the slots 136 or 145. At this point it may also be well to state that the cams 116 and 134 are so arranged relatively that the chamfering tool is withdrawn from its operative position before the cut off tool has completed the severance of the nut blank. This relative arrangement is shown particularly clear in Fig. 6. In Fig. 22, there is also shown a screw 151 threaded into the chamfering tool support and carried by a wedge 151ª. By adjusting this wedge all play caused by wear may be taken up.

The same machine may be required to make what is known as machine nuts in one instance and then again it may be required to make castellated nuts. Where this change is required, or where different sizes of nuts are required, it is also necessary to shift the chamfering tool back and forth in the direction of the longitudinal axis of the machine. For this reason I have provided the supplemental chamfering tool support 144. This support is shown in detail in Figs. 22 and 23 and from these figures, it will be noted that it includes a pair of clamping bearings 152 held in clamping engagement with a pair of stub shafts 153 rigidly carried by the stationary bearing portions 154 of the general framework. Therefore, by slackening the screws 155 which hold the split portions of the bearings 152 in engagement with these stub shafts, the entire supplemental framework may be shifted back and forth to the required position of adjustment. This adjustment may be effected to a very fine degree by means of the screw shown at 156 as being threaded into the rear portion of the chamfering tool support and rotatably mounted in the main frame bearing 154, all as illustrated in Fig. 9.

In order that it is impossible for the cut off tool 125 to carry the severed blank back with it in its return movement, by wedging it between one face of this tool and the stop formed by the bushing 84, I have provided the chamfering tool support with a depending finger 157, this finger being so located that it projects to the rear side of the severed blank and between the cut off tool and the stop bushing 84. Thus, when the cut off tool is retracted to assume the position shown in Fig. 6, it cannot carry the newly severed blank back with it because of the engagement of the finger 157 with this blank and, therefore, it is deposited into the chute formed by the walls 158, Fig. 3, of the main framework. This chute is located directly beneath the cut off tools and, therefore, all severed blanks are dropped into it to subsequently slide down its inclined base wall and enter the inner open end of a sifter shown at 159, Fig. 2. This sifter is of somewhat cylindrical form having its rear end of a smaller diameter than its forward end and also rigidly mounted on the shaft 48. Rotation of this shaft, therefore, also rotates the sifter 159 and because of the inclination of the cylinder walls, the nut blanks are gradually fed out its open front end to be deposited in a receptacle 160. It will also be observed that this sifter is provided with a plurality of apertures of smaller size than the nut blanks and since all the shavings formed by the cut off tool, the chamfering tool and the boring tool are also deposited in this chute, these shavings are sifted from the nut blanks by passing through the apertures 161 and deposited in the receptacle 162 located directly beneath the sifter. The shaft 48 is also provided with an arm 163 carrying a blade 164 at its lower end, this blade being so arranged that it slides through the receptacle 160 to sweep all of the deposited nut blanks forward or out of the receptacle. In this way, the finished product is automatically separated from the shavings and also ejected from the machine.

From the foregoing, it will be apparent that I have provided a machine for making nut blanks which embodies quite a number of improvements over the machine illustrated in my prior Patent No. 884,125 and issued April 7, 1908. These improvements consist essentially in the arrangement whereby the chamfering tool is withdrawn, before the cut off tool has completed the severance of the blank, in order to obviate all score marks from the finished product, the particular structure whereby a large range of adjustment may be gotten for the chamfering tool, cut off tool and boring tool, the means whereby this chamfering tool may be adjusted laterally, the particularly novel type of stop embodied in the bushing 84 etc. Attention is also directed to the fact that by changing the sizes of the gears 56 and 57, as shown in Fig. 13, the rate of feed of the chamfering tool, the cut off tool and the boring tool may be varied without altering the rate at which the stock bar is fed into the machine. In this way, large sized nuts may be cut from the stock bar at the same time that a similar sized nut is cut, although this arrangement is used principally to adapt and adjust the machine to the various types of steel used in the manufacture of these nuts. Sometimes this steel is hard and sometimes it is comparatively soft and, therefore, the rate of feed of these tools may be correspondingly carried to attain the maximum out-put of the machine.

What I claim, is:

1. The herein described method of making nut blanks which consists in rotating the stock, feeding a cut off tool into said stock to cut the blanks therefrom, feeding a chamfering tool into said stock at the same time said cut off tool is being fed in, and withdrawing said chamfering tool before the cut off tool completes the severance of the blank.

2. A nut blank making machine comprising a rotatable chuck to hold the metal stock, a boring tool in alinement with said stock, a cut off tool, a chamfering tool, and means for feeding said tools into and away from the stock bar but withdrawing the chamfering tool out of contact with the work before the cut off tool has completed the severance of the blank, said means being such that both of said tools operate on said stock simultaneously.

3. A nut blank making machine comprising a rotatable chuck to hold the metal stock bar, a boring tool in alinement with said stock bar, means for feeding the stock bar through said chuck, a stop against which the end of the stock bar is fed, a cut off tool, means for feeding said tool into and away from said stock bar, and a finger arranged to be in a substantially stationary position in the direction of the withdrawing movement of said cut off tool and disposed in back of the end of the stock bar to be cut off to prevent the cut off tool drawing the severed blank back with it.

4. A nut blank making machine comprising a rotatable chuck to hold the metal stock bar, a boring tool in alinement with said stock bar, means for feeding the stock bar through said chuck, a stop against which the end of the stock bar is fed, a cut off tool, means for feeding said tool into and away from said stock bar, a chamfering tool and support disposed at substantially a right angle to said cut off tool, and a depending finger carried by said chamfering tool support and disposed in the rear of the end of said stock bar to be cut off to prevent the cut off tool drawing the severed blank back with it.

5. A nut blank making machine comprising a rotatable chuck to hold the metal stock bar, a boring tool in alinement with said stock, means for feeding the stock bar through said chuck, and a longitudinally alining stop for limiting the forward movement of said stock bar formed through a portion of its length with a longitudinal bore for guiding said boring tool, said stop being open on its front under side to allow the escape of the shavings from said boring tool.

6. A nut blank making machine comprising a rotatable chuck to hold the metal stock bar, a boring tool in alinement with said stock bar, means for feeding said stock bar through said chuck, and a stop for limiting the forward movement of said stock bar comprising an adjustably mounted supporting member, and a longitudinally bored bushing within said support against which the stock bar rests and through which the boring tool passes, the forward under half of that portion of said bushing against which the stock bar rests being cut away to allow the escape of the shavings from said stool.

7. A nut blank making machine comprising a general framework, a rotatable chuck to hold the metal stock bar, a boring tool in alinement with said stock bar, means for feeding said stock bar through said chuck, a cut off tool, a support therefor, a chamfering tool, a support therefor, means for moving said chamfering tool support toward and away from the stock bar, and means whereby said chamfering tool support may be adjusted laterally or longitudinally of the stock bar.

8. A nut blank making machine comprising a general framework, a rotatable chuck to hold the metal stock bar, a boring tool in alinement with said stock bar, means for feeding said stock bar through said chuck, a cut off tool, a horizontally movable support therefor, a chamfering tool, a chamfering tool support disposed at right angles to said cut off tool support, a lever pivoted intermediate its ends to the upper portion of said framework, a pin and slot connection between one end of said lever and said chamfering tool support, said lever having a slot in its other end, a shaft journaled in said framework, a cam on said shaft, a lever pivoted intermediate its ends to the underside of said framework, said last named lever having a slot in one end and arranged to coöperate at its other end with said cam, and a link connection between the slotted ends of said two levers.

9. In a nut blank making machine, means for feeding the stock bar into said machine, means for severing the nut blanks therefrom in predetermined lengths, a rotatable hollow cylinder having a plurality of apertures in its side wall of less size than the severed nut blanks, and a spout for guiding the severed blanks into one end of said cylinder.

10. In a nut blank making machine, means for feeding the stock bar into said machine, means for severing the nut blanks therefrom in predetermined lengths, a hollow rotatable cylinder larger at one end than the other and having a plurality of apertures in its side wall of less size than the severed blanks, a spout for guiding the severed blanks into one end of said cylinder, a pan adjacent the other end of said cylinder into which the severed blanks are collected, means for severing the collected blanks forward in said pan, and a pan beneath said cylinder for catching the shavings sifted through said apertures.

In testimony whereof I affix my signature in presence of two witnesses.

LATHAM H. BRIGHTMAN.

Witnesses:
 WALTER E. S. BOCK,
 A. L. PHELPS.